(12) United States Patent
Wang et al.

(10) Patent No.: US 9,542,211 B2
(45) Date of Patent: Jan. 10, 2017

(54) CO-DESIGNED DYNAMIC LANGUAGE ACCELERATOR FOR A PROCESSOR

(71) Applicant: Intel Corporation, Santa Clara, CA (US)

(72) Inventors: Cheng Wang, San Ramon, CA (US); Youfeng Wu, Palo Alto, CA (US); Hongbo Rong, San Jose, CA (US); Hyunchul Park, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 14/225,755

(22) Filed: Mar. 26, 2014

(65) Prior Publication Data

US 2015/0277866 A1 Oct. 1, 2015

(51) Int. Cl.
| G06F 9/45 | (2006.01) |
| G06F 9/455 | (2006.01) |
| G06F 13/10 | (2006.01) |
| G06F 9/44 | (2006.01) |

(52) U.S. Cl.
CPC ........... *G06F 9/45516* (2013.01); *G06F 13/10* (2013.01); *G06F 9/4411* (2013.01); *G06F 9/4552* (2013.01)

(58) Field of Classification Search
CPC .. G06F 9/45516; G06F 9/4411; G06F 9/4552; G06F 13/10; G06F 8/43
USPC ........................................................ 717/148
See application file for complete search history.

(56) References Cited

U.S. PATENT DOCUMENTS

| 6,282,702 B1 | 8/2001 | Ungar | |
| 2003/0023958 A1* | 1/2003 | Patel | G06F 9/30174 717/146 |
| 2004/0236927 A1* | 11/2004 | Irie | G06F 9/30134 712/209 |
| 2005/0149694 A1* | 7/2005 | Patel | G06F 9/30174 712/36 |
| 2005/0240915 A1* | 10/2005 | Patel | G06F 9/30174 717/148 |
| 2006/0026565 A1* | 2/2006 | Cabillic | G06F 9/30174 717/118 |
| 2007/0118724 A1* | 5/2007 | Patel | G06F 9/30174 712/202 |
| 2012/0032965 A1 | 2/2012 | Patel et al. | |

OTHER PUBLICATIONS

Flavius Gruian, et al., "Automatic Generation of Application-Specfic Systems Based on a Micro-Programmed Java Core," In: Proceedings of the 2005 ACM Symposium on Applied Computing (SAC), ISBN 1-58113-964-0, pp. 879-884, Mar. 13-17, 2005.
International Searching Authority, "Notification of Transmittal of the International Search Report and the Written Opinion of the International Searching Authority," mailed May 29, 2015, in International application No. PCT/US2015/022613.
U.S. Appl. No. 13/631,408, filed Sep. 28, 2012, entitled, "Flexible Acceleration of Code Execution," by Cheng Wang, et al.

* cited by examiner

*Primary Examiner* — Viva Miller
(74) *Attorney, Agent, or Firm* — Trop, Pruner & Hu, P.C.

(57) ABSTRACT

In an embodiment, a processor includes at least one core and a dynamic language accelerator to execute a bytecode responsive to a memory mapped input/output (MMIO) operation on a file descriptor associated with the dynamic language accelerator. The processor may block execution of native code while the dynamic language accelerator executes the bytecode. Other embodiments are described and claimed.

15 Claims, 3 Drawing Sheets

CO-DESIGNED DYNAMIC LANGUAGE ACCELERATOR FOR A PROCESSOR

BACKGROUND

A so-called hardware (HW)/software (SW) co-designed technique enables performance-efficient processor (e.g., central processing unit (CPU)) designs without x86 instruction set architecture (ISA) backwards compatibility issues. The performance-efficient CPU implements an internal implementation ISA (e.g., in the form of micro-operations (uops)), and internal code morphing software (CMS) emulates the x86 code execution on the CPU by translating x86 code into the code of an internal implementation ISA for execution. However, there are many complexities in performing such translations that can affect processor efficiency. Among these complexities are the overhead of performing just-in-time (JIT) compilation in a virtual machine to enable dynamic languages such as Java/JavaScript/PHP, which are designed to run portable bytecode on different platforms, to effect translation to the internal implementation ISA.

DETAILED DESCRIPTION

In various embodiments, a HW/SW co-designed dynamic language accelerator is provided in a processor to allow bytecode to run efficiently via an accelerator interface without the need of JIT compilation in a virtual machine (VM).

Figure 1:
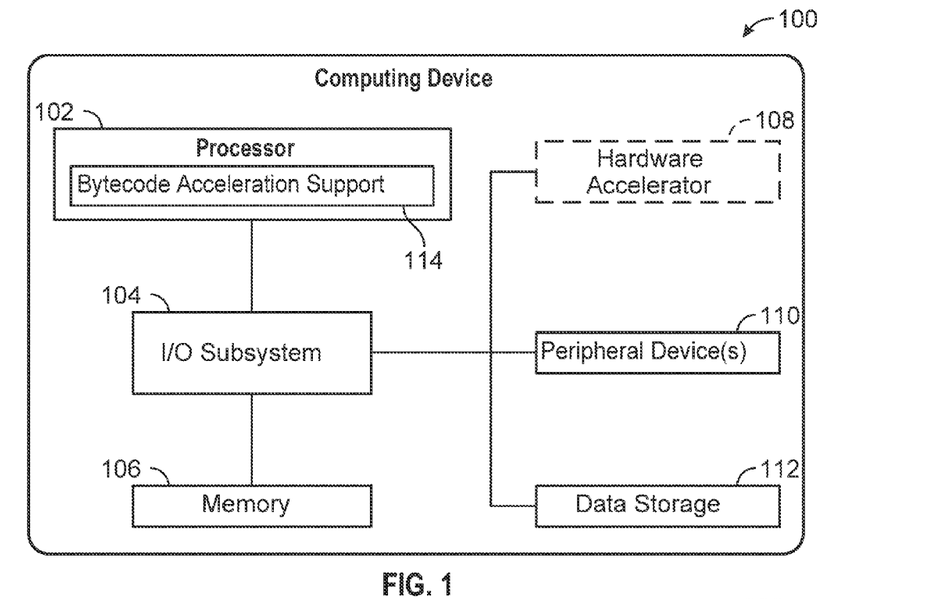
FIG. 1 is a simplified block diagram of at least one embodiment of a computing device for accelerating code execution.

Referring now to FIG. 1, a computing device 100 may be embodied as any type of computing device capable of accelerating code execution and performing the functions described herein. For example, the computing device 100 may be embodied as a mobile phone, a smart phone, a tablet computing device, a personal digital assistant, a messaging device, a consumer electronic device, a handset, a laptop computer, a desktop computing, and/or any other computing/communication device. As shown in FIG. 1, the illustrative computing device 100 includes a processor 102, an input/output (I/O) subsystem 104, a memory 106, a hardware accelerator 108, one or more peripheral devices 110, and data storage 112. Of course, the computing device 100 may include other or additional components, such as those commonly found in a computing device (e.g., various input/output devices), in other embodiments. Additionally, in some embodiments, one or more of the illustrative components may be incorporated in, or otherwise form a portion of, another component. For example, the memory 106, or portions thereof, may be incorporated in the processor 102 in some embodiments.

The processor 102 may be embodied as any type of processor capable of performing the functions described herein. For example, the processor may be embodied as a single or multi-core processor(s), digital signal processor, microcontroller, or other processor or processing/controlling circuit. Similarly, the memory 106 may be embodied as any type of volatile or non-volatile memory or data storage capable of performing the functions described herein. In operation, the memory 106 may store various data and software used during operation of the computing device 100 such as operating systems, applications, programs, libraries, and drivers. The memory 106 is communicatively coupled to the processor 102 via the I/O subsystem 104, which may be embodied as circuitry and/or components to facilitate input/output operations with the processor 102, the memory 106, and other components of the computing device 100. For example, the I/O subsystem 104 may be embodied as, or otherwise include, memory controller hubs, input/output control hubs, firmware devices, communication links (e.g., point-to-point links, bus links, wires, cables, light guides, printed circuit board traces, etc.) and/or other components and subsystems to facilitate the input/output operations. In some embodiments, the I/O subsystem 104 may form a portion of a SoC and be incorporated, along with the processor 102, the memory 106, and other components of the computing device 100, on a single integrated circuit chip. Further, in some embodiments, the processor 102 includes bytecode acceleration support 114 to accelerate code execution. The bytecode acceleration support 114 may be embodied as any type of component or circuitry capable of accelerating the execution of one or more instructions or bytecode executing on the processor 102 and capable of performing the functions described herein.

The hardware accelerator 108 may be embodied as any type of hardware device or component capable of accelerating the execution of one or more instructions or bytecode associated with a software application and capable of performing the functions described herein. For example, the hardware accelerator 108 may be embodied as, or otherwise include, a graphics accelerator, a floating-point accelerator, or other hardware accelerator device. As discussed below, in some embodiments, the hardware accelerator 108 may be configured to accelerate code that is not dependent on an operating system (OS) of the computing device 100. In some embodiments, the hardware accelerator 108 may form a portion of a SoC along with one or more other components of the computing device 100.

The peripheral devices 110 of the computing device 100 may include any number of peripheral or interface devices or components. For example, the peripheral device 110 may include communication circuitry to communicate with remote devices. The particular devices included in the peripheral devices 110 may depend on, for example, the intended use of the computing device 100. The data storage 112 may be embodied as any type of device or devices configured for short-term or long-term storage of data such as, for example, memory devices and circuits, memory cards, hard disk drives, solid-state drives, or other data storage devices.

Figure 2:
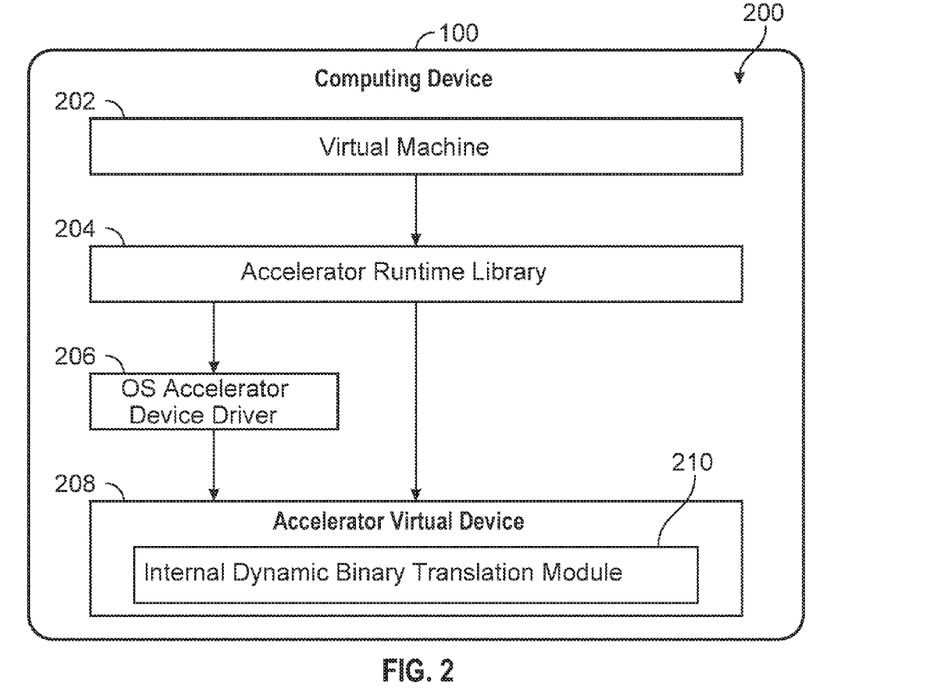
FIG. 2 is a simplified block diagram of at least one embodiment of an environment of the computing device of FIG. 1.

As shown in FIG. 2, the computing device 100 may establish an environment 200 for accelerating code. The environment 200 in an illustrative embodiment provides a software environment that includes a virtual machine 202, an accelerator runtime library 204, an OS accelerator device driver 206, an accelerator virtual device 208, and an internal dynamic binary translation module 210.

The virtual machine 202 may probe the computing device 100 to determine whether the accelerator virtual device 208 is supported by the computing device 100 using, for example, an I/O instruction or other software I/O interface. The accelerator runtime library 204 may implement an application programming interface (API) of the accelerator virtual device 208. In doing so, the accelerator runtime library 204 may permit the accelerator virtual device 208 to be accessed through the OS accelerator device driver 206 and through memory-mapped I/O. As discussed below, in some embodiments, the OS accelerator device driver 206 is used only to initialize the accelerator virtual device 208. Thereafter, the accelerator virtual device 208 may be accessed via memory-mapped I/O to trigger code acceleration. The OS accelerator device driver 206 may be used to initialize the accelerator virtual device 208 using, for example, standard operating system I/O instructions. The accelerator virtual device 208 may include the internal dynamic binary translation module 210, which may be used to accelerate code execution. In some embodiments, the internal dynamic binary translation module 210 virtualizes the accelerator virtual device 208 by transparently translating non-ISA codes (e.g., Dalvik bytecode, JavaScript, HTML5, etc.) into internal ISA code using the hardware accelerator 108 and/or the bytecode acceleration support 114. In some embodiments, including the illustrative embodiment, the internal dynamic binary translation module 210 is internal to the processor 102 and transparent to external software, including the operating system of the computing device 100. As such, external software may recognize the accelerator virtual device 208 but not the internal dynamic binary translation module 210. Further, in some embodiments, the internal dynamic binary translation module 210 can utilize various hardware accelerator supports in the internal ISA to translate code from different languages transparently.

Figure 3:
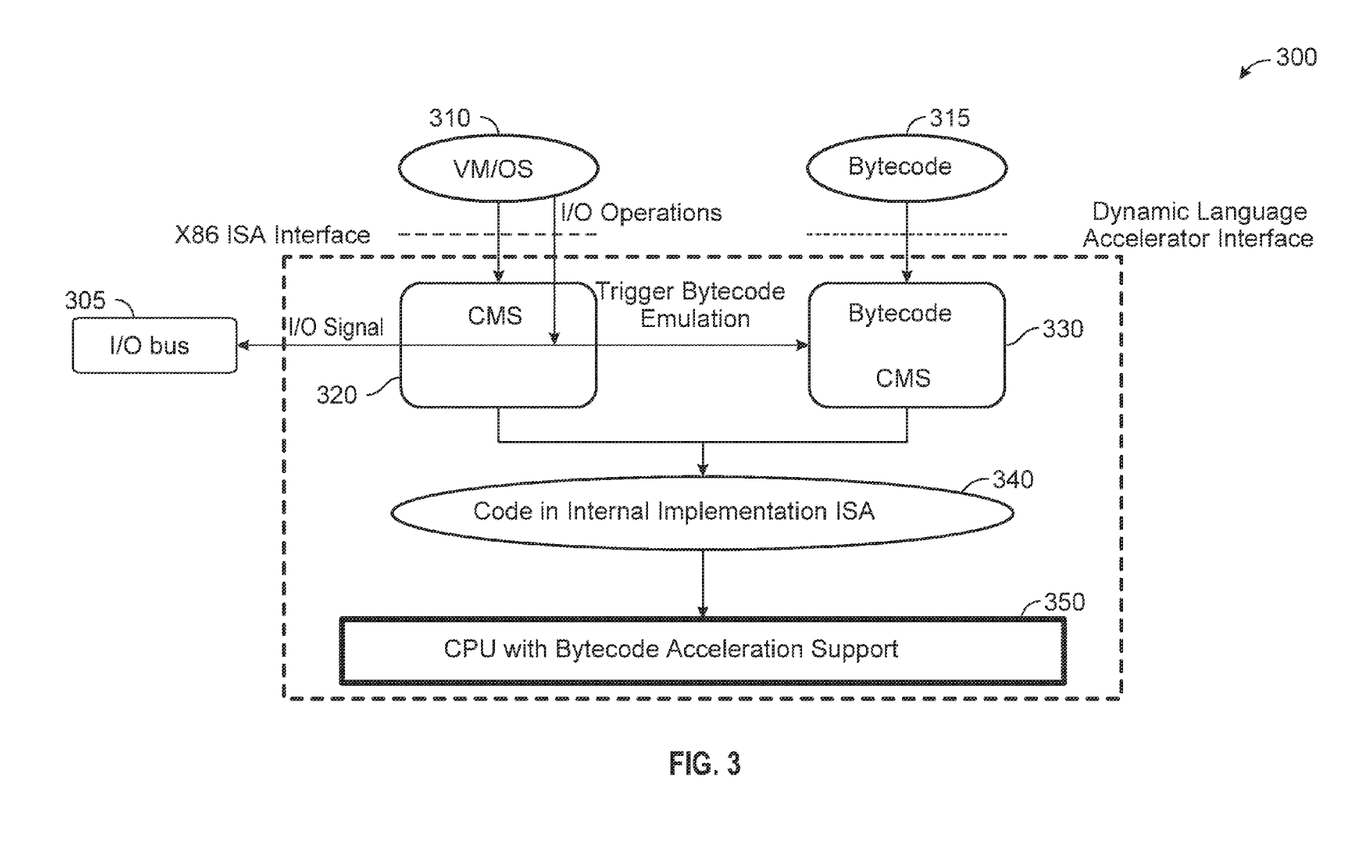
FIG. 3 is a block diagram of a processor in accordance with another embodiment of the present invention.

Referring now to FIG. 3, shown is a block diagram of a processor in accordance with another embodiment of the present invention. As shown in FIG. 3, a processor 300 is configured to perform bytecode execution through a HW/SW co-designed dynamic language accelerator. In the illustration of FIG. 3, processor 300 includes multiple interfaces, including an x86 ISA interface to interface a VM/OS 310 with the processor via I/O operations. In addition, a dynamic language accelerator interface is present to enable communications of bytecode 315, e.g., received from a VM and an accelerator device driver working in concert.

As further shown in FIG. 3, the incoming operations are provided to a code morphing software (CMS) unit 320 which may perform various translations to generate code in an internal implementation ISA format, which may be stored in a temporary storage 340 (which in an embodiment may be given cache memory, buffer or so forth). In addition, for triggering bytecode emulation, incoming bytecode is provided to a bytecode CMS unit 330 that may perform bytecode emulation to thus generate code in the internal implementation ISA. As seen, this code is provided to a CPU 350 that may include one or more cores and other logic, and further provides for bytecode acceleration support, e.g., via a dynamic language accelerator as described herein. Although shown at this high level in the embodiment of FIG. 3, understand that many variations are possible.

In the implementation of FIG. 3, x86 code executes in VM/OS 310 conventionally through an x86 ISA interface, which emulates x86 code execution through internal CMS unit 320. In addition to the x86 ISA interface, there is also a dynamic language accelerator interface. Using an embodiment, VM/OS 310 may use standard x86 I/O operations to manage a dynamic language accelerator, just as a conventional hardware accelerator is managed in other processors. Here however, instead of sending an I/O signal to I/O bus 305, x86 I/O operations for the dynamic language accelerator trigger emulation of bytecode execution through internal bytecode CMS 330, which translates the bytecode into code of the internal implementation ISA for execution on the performance-efficient CPU with specialized bytecode acceleration support.

There are many new properties in this HW/SW co-designed dynamic language accelerator that make the programming on it different from the programming on a conventional accelerator. Embodiments described herein enable such programming in a flexible and efficient manner.

Using embodiments and techniques described herein, a VM implementation using a HW/SW co-designed dynamic language accelerator may achieve: ISA transparency, in that no ISA change or extension is provided to support the dynamic language accelerator (in other words, accesses to the dynamic language accelerator are through standard x86 I/O operations); OS transparency, in that no changes to an existing OS implementation are implemented to support the dynamic language accelerator (note however, an OS kernel accelerator driver may be optionally plugged into an existing OS to manage dynamic language acceleration, as described below); portability, in that a VM may implement a portable bytecode interpreter without complicated non-portable JIT compilation (note that in some embodiments minor changes may be provided to port an existing VM implementation to run bytecode through the dynamic language accelerator); and flexibility, in that the dynamic language accelerator can flexibly support different VM implementations.

Dynamic language programs execute in a user-level virtual machine. Like other HW accelerators, user-level applications (such as a VM) access the dynamic language accelerator device through standard OS calls to an OS kernel accelerator device driver. Table 1 below shows an example VM implementation for open/close of the accelerator device on an example system (which may be a LINUX™-based system). If a VM cannot open the accelerator device (either due a lack of dynamic language accelerator support in the CPU or lack of an OS kernel driver for the accelerator), the VM can execute bytecode conventionally. Otherwise, when support is available the VM executes the bytecode using the dynamic language accelerator, using a call as in Table 1, below.

TABLE 1

```
VM( ) {
    initialize the virtual machine state (including the initial bytecode
    states)
    if(fd = open("/dev/accelerator", ...)) { // associate fd with the
    accelerator
        ... // use dynamic language accelerator to run bytecode until end
        of
    bytecode
    close(fd);
    }
    else {
        run using VM interpretation
    }
}
```

There are several unique properties in the dynamic language accelerator that make its programming different than programming a conventional HW accelerator. For example, a HW accelerator may support both blocking I/O operations and non-blocking I/O operations. The non-blocking I/O operations may be useful for OS/runtime to efficiently manage the HW accelerator for running concurrently with x86 code on the CPU. However the dynamic language accelerator shares execution on the same CPU as the x86 code. As such, the dynamic language accelerator may only support blocking I/O operations, which simplifies both the VM programming and CMS implementation without considering complicated synchronization for non-blocking I/O operations.

Moreover, unlike a HW accelerator that typically communicates with x86 code through direct memory accesses (DMA) on shared physical memory, the dynamic language accelerator runs like a co-processor, which directly works on the x86 context/state (e.g., x86 registers and virtual memory). This arrangement not only simplifies the programming on the dynamic language accelerator without the need for explicit communications between the accelerator execution and x86 code execution, but also provides a security control for bytecode execution because the bytecode will only run in the VM process privilege level.

Without any x86 ISA change or extension, bytecode execution on an accelerator may be implemented as a function call. That is, as shown in Table 2 below, an x86 blocking memory-mapped I/O operation may be used to trigger execution of bytecode on the accelerator. After the triggering, x86 code execution is blocked and the accelerator begins to execute the bytecode just like a normal function call to the bytecode. After the bytecode execution finishes, the blocked x86 code execution resumes, just like a function call return.

TABLE 2

```
VM( ) {
    initialize the virtual machine state (including the initial bytecode
    states)
    if(fd = open("/dev/accelerator", ...)) { // associate fd with the
    accelerator
        trigger accelerator execution through a memory-mapped I/O
        operation on fd
        close(fd);
    }
    else {
        run using VM interpretation
    }
}
```

Bytecode execution on the accelerator uses x86 states to emulate bytecode states, which depends on the mapping from the bytecode states to the x86 states. For example, if a bytecode register R0 is mapped to an x86 register EAX, then to emulate a bytecode that modifies R0, the accelerator will modify the x86 register EAX correspondingly. Internally, the bytecode CMS will again map the x86 states to its internal implementation ISA states, just like the emulation of the x86 states in the x86 code execution.

Different VMs may implement different mappings from bytecode states to x86 states. To support different VM implementations, each of multiple VMs may flexibly configure the mapping on the dynamic language accelerator through the OS accelerator device driver. Table 3 below shows an example VM implementation, in which an OS system call (ioctl) is used to configure the accelerator, such that multiple VMs may be flexibly supported.

TABLE 3

```
VM( ) {
    initialize the virtual machine state (including the initial bytecode
    states)
    if(fd = open("/dev/accelerator", ...)) { // associate fd with the
    accelerator
        ioctl(fd); //configure accelerator associated with fd
        trigger accelerator execution though a memory-mapped I/O
```

TABLE 3-continued

```
        operation on fd
        close(fd);
    }
    else {
        run using VM interpretation
    }
}
```

Although x86 memory-mapped I/O operations that trigger the accelerator execution block until the accelerator execution is finished, such operations may not block HW interrupt handling due to the potentially long latency in the accelerator execution. So in case of HW interrupts, accelerator execution may stop and the blocked x86 code execution resumes (i.e., the blocking I/O operation finishes). Although interrupts may happen asynchronously to the accelerator execution, the accelerator may stop with precise states at a bytecode instruction boundary. In this way, the VM may correctly resume the bytecode execution after the interrupt handling. Various HW/SW co-designed techniques may be used to achieve the precise interrupt state in bytecode execution, just like the precise interrupt state in x86 execution.

Due to the interrupts, the dynamic language accelerator execution may stop non-deterministically. To this end, a VM may repeatedly trigger bytecode acceleration in a loop until the end of bytecodes occurs, as seen in Table 4.

TABLE 4

```
VM( ) {
    initialize the virtual machine state (including the initial bytecode
    states)
    if(fd = open("/dev/accelerator", ...)) { // associate fd with the
    accelerator
        ioctl(fd, ...); // configure the accelerator associated with fd
        while(not end of bytecode) {//repeated trigger of accelerator
            trigger accelerator execution through a memory-mapped I/O
            operation on
            fd
        }
        close(fd);
    }
    else {
        run using VM interpretation
    }
}
```

Exclusive accelerator access may place restrictions on the software using the accelerator. For example, software cannot open an exclusive accelerator unless no other software is using it. The OS typically supports shared accelerator access such that the code can run on the accelerator with time sharing. For shared accelerator access, HW interrupts between the repeated triggers of the accelerator execution as in above Table 4 may cause a context switch to run another (possibly different) virtual machine using the accelerator. As such, no bytecode state (including the configuration of the accelerator) may be maintained internally within the accelerator (e.g., with the bytecode CMS) across repeated triggers of the dynamic language accelerator execution (e.g., as a stateless acceleration). Stated another way, each triggering of bytecode acceleration may explicitly provide the entire bytecode state (emulated by x86 states) as inputs to the accelerator execution and after the accelerator stops, the entire bytecode state is output from the accelerator.

Table 5 shows an example VM implementation with stateless acceleration. Each triggering of the bytecode acceleration provides an identifier that is associated with the virtual machine states (including the bytecode states) through configuration of the accelerator. Then the bytecode accelerator will work on the bytecode states associated with the identifier.

TABLE 5

```
VM( ) {
    initialize the virtual machine state (including the initial bytecode
    states)
    if(fd = open("/dev/accelerator", ...)) { // associate fd with the
    accelerator
        id = ioctl(fd, ...); // configure the accelerator associated with fd
                // with the complete virtual machine state
        while(not end of bytecode) {
            trigger accelerator execution with id through
                    a memory-mapped x86 I/O operation on fd
        }
    }
    else {
        run using VM interpretation
    }
}
```

Exceptions also may occur during accelerator execution. For example, bytecode executing in the virtual memory of a VM application may trigger a paging exception to swap a virtual page. This exception can happen in bytecode execution even with a managed runtime. Exception handling during accelerator execution can be complex, as the exception handler may expect to see that an x86 instruction, and not a bytecode instruction, raises the OS exception handling. Thus in an embodiment, to provide for OS transparency OS exception handling is not raised during the accelerator execution. Instead, the accelerator execution stops with the precise bytecode states before the bytecode instruction that causes the exception.

Since the accelerator execution does not raise any OS exception handling, the repeated triggers of accelerator execution in Table 5 may not make forward progress if accelerator execution stopping is caused by an exception. To this end, a portable interpreter of the VM may be used for forward progress, as shown in Table 6. Between the repeated triggers of accelerator execution, one bytecode is interpreted, just like interpretation of bytecode in a conventional VM without a dynamic language accelerator. In this way, the exception is raised and handled during the bytecode interpretation.

TABLE 6

```
VM( ) {
    initialize the virtual machine state (including the initial bytecode
    states)
    if(fd = open("/dev/accelerator", ...)) { // associate fd with the
    accelerator
        id = ioctl(fd, ...); // configure the accelerator with the virtual
        machine state
        while(not end of bytecode) {
            trigger accelerator execution with id through
                    a memory-mapped I/O operation on fd
            interpret one bytecode
        }
    }
    else {
        run using VM interpretation
    }
}
```

Another issue with the dynamic language accelerator is that certain bytecode instruction execution may call to a VM/OS dependent native library. For example, a memory allocation bytecode instruction may call the library for allocating new memory, which may depend on VM/OS memory management. As another example, a synchronization bytecode instruction may call the runtime library for synchronization between threads, which may depend on VM/OS thread/synchronization management. In such cases, an I/O bytecode instruction calls the library for I/O operations, which may depend on the VM/OS I/O management. Bytecode may also support direct native library calls (e.g., Java Native Interface or JNI). For flexibility to support different VMs and OSs, such VM/OS dependent library code may not be executed in the dynamic language accelerator.

Various approaches may be used to handle a VM/OS dependent library. First, accelerator execution may be stopped with a precise state at a bytecode boundary before the bytecode that is to call the VM/OS dependent library, just like the stopping of accelerator execution due to exceptions. Then bytecode interpretation following the accelerator execution may occur as in above Table 6 to perform these library calls naturally in the VM.

Another, and possibly more efficient way to interact with a VM/OS dependent library is to call back to the native function during the accelerator execution. However, there are two issues with the direct callback to the native function during accelerator execution. First, the native library call interface may be VM dependent. Second, the native function cannot directly return back to the accelerator execution as for ISA transparency, the accelerator execution may only be triggered by memory-mapped I/O operations. Thus in some embodiments, an accelerator native interface may be defined such that during accelerator execution, it can call back to this accelerator native interface for native library calls.

Table 7 shows an example accelerator native interface. A given accelerator may be configured with this accelerator native interface. Then in case of a native library call, the accelerator calls to the accelerator native interface with the native function pointer put into native_func. After the execution of the native function, the accelerator native interface may trigger return to the accelerator through a memory-mapped I/O.

TABLE 7

```
accelerator_native_interface(native_func, fp, id, ...) {
    call native_func following the native library interface
    trigger accelerator execution with id though
            a memory-mapped I/O operation on fd
}
```

Of course, it should be appreciated that the Tables 1-7 discussed above, and the pseudocode therein, are directed to specific implementations and provided for illustration. The concepts discussed herein are not so limited and other implementations may be created having pseudocode different from that discussed above.

Using the embodiments and techniques described herein, the dynamic language accelerator operates to accelerate bytecode execution through an accelerator interface and an internal bytecode translation in CMS. Unique properties in the dynamic language accelerator may be leveraged to provide approaches for programming the dynamic language accelerator to achieve ISA transparency, OS transparency, portability and flexibility.

Figure 4:
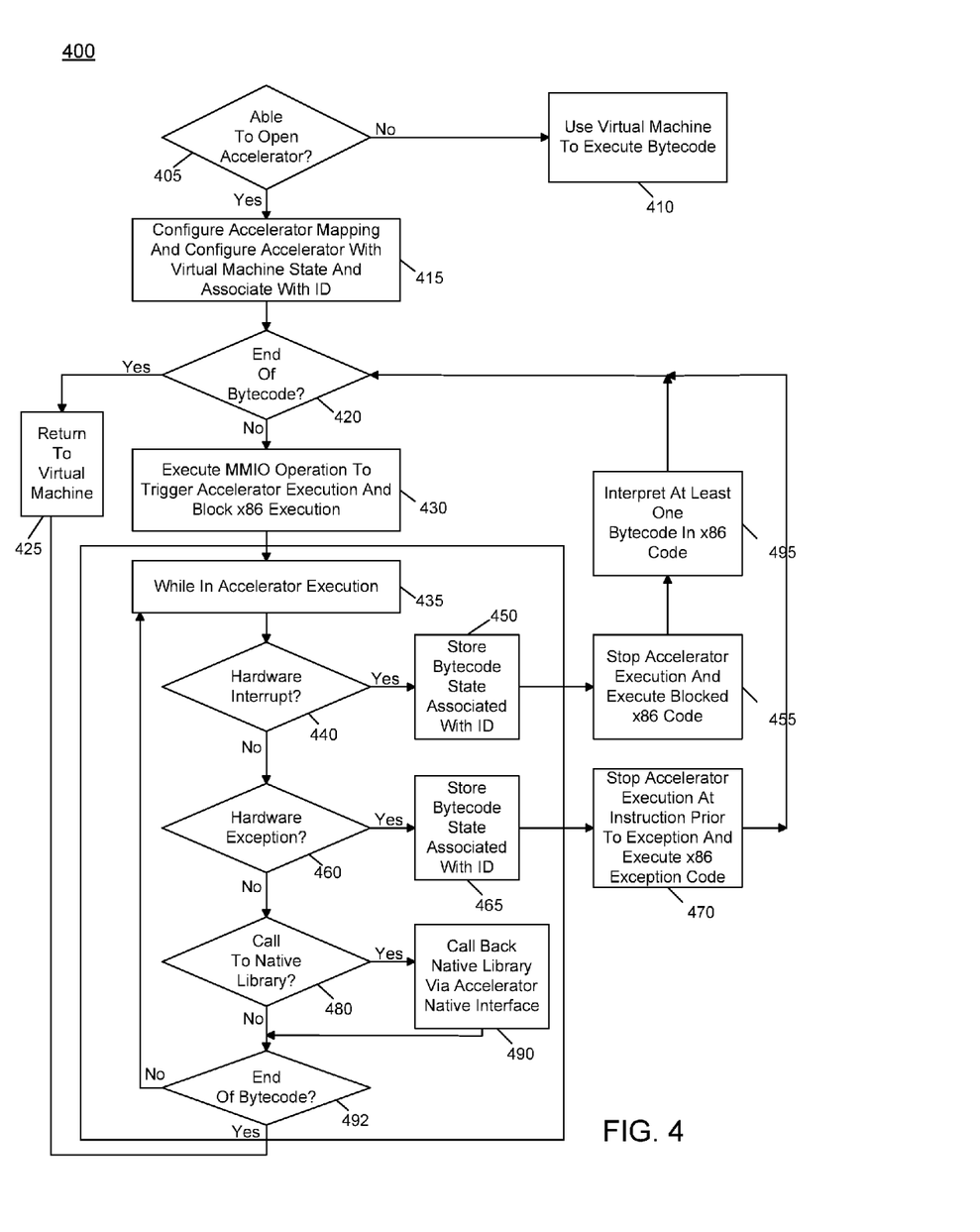
FIG. 4 is a flow diagram of a method in accordance with an embodiment of the present invention.

Referring now to FIG. 4, shown is a flow diagram of a method in accordance with an embodiment of the present invention. In general, FIG. 4 describes a method for performing various operations in bytecode acceleration using a dynamic language accelerator as described herein. In general, the various operations of method 400 may be performed in connection with the execution of a VM on a given processor.

Method 400 begins by determining whether the VM is able to open the accelerator (diamond 405). In an embodiment, this determination may be made as described above in Table 1, where a pathname is provided to the dynamic language accelerator by associating a file descriptor with the accelerator. Note that if there is no support or driver for the accelerator, control passes to block 410 where the VM itself may be used to execute bytecode, e.g., by bytecode interpretation.

Instead when it is determined that the VM is able to open the accelerator, control passes to block 415 where the accelerator may be configured. More specifically, the accelerator may be configured with a mapping from bytecode states to x86 states and further to associate the VM state with an identifier. Next control passes to diamond 420 where it is determined whether the end of bytecode that is to be executed has been reached. If so, control passes to block 425 where control may return to the VM.

Otherwise, control passes to block 430 where an MMIO operation may be executed to trigger the accelerator execution and to block x86 code from operation. As such, the device language accelerator operates in a blocking environment, for ease of implementation. Thus at this point, accelerator execution occurs at block 435 during which at least a portion of the bytecode is executed. As seen in FIG. 4, during such accelerator execution it can be determined whether one or more of a given set of events occurs.

More specifically still with reference to FIG. 4, during the accelerator execution control next passes to diamond 440 where it can be determined whether a hardware interrupt has occurred. If so, a bytecode state associated with the identifier may be stored, e.g., in a temporary storage such as a cache memory (block 450). Next, control passes to block 455 where accelerator execution may be stopped and blocked x86 code may be executed. Such x86 code may be associated with the interrupt and may correspond to an interrupt handler or other x86 code.

At the conclusion of this native code (e.g., interrupt handler), control passes to block 495 where at least one bytecode of the bytecode may be interpreted within the VM. Note that this bytecode interpretation via a portable interpreter of the VM enables forward progress to be made in the condition in which an interrupt or other such circumstance arises. As seen, control then passes back to diamond 420, discussed above.

During accelerator execution, if no hardware interrupt is received as determined at diamond 440, control passes to diamond 460 where it may be determined whether a hardware exception has occurred. If so, control passes to block 465 where a bytecode state associated with the identifier may be stored, e.g., in the cache memory. Thereafter, accelerator execution may be stopped (block 470). More specifically, the accelerator execution may be stopped at an instruction prior to the exception such that the exception is masked. At this time, x86 code may be executed. More specifically, the x86 code execution will trigger the exception to occur, and thus trigger native exception code such as an exception handler to handle the exceptional event. After such execution, control passes to diamond 420, discussed above, for further accelerator execution (if the end of the bytecode has not been reached).

Still referring to FIG. 4, if no hardware exception occurs as determined at diamond 460, control instead passes to diamond 480. There it may be determined whether a call to a native library is desired. If so, control passes to block 490 where, via an accelerator native interface, a callback to a native library may occur. In this native library, a desired function may be performed, and where the results of the function may be used for further bytecode execution in the dynamic language accelerator. After such execution, control passes diamond 492 to determine whether the end of bytecode has occurred. If so, control returns to the VM. Otherwise control passes to block 435 for further execution of bytecode within the accelerator as discussed above. Although shown at this high level in the implementation of FIG. 4, understand that variations are possible and the scope of the present invention is not limited in this regard.

Because a HW/SW co-designed dynamic language accelerator runs below the OS, the accelerator thus may handle interrupt/exception issues. In contrast, a conventional virtual machine runs above the OS and is not affected by system issues such as interrupt/exception handling because the OS handles them transparently. Also, in contrast to a CMS that only runs x86 code (whose semantics are well-defined by a given ISA), a dynamic language accelerator in accordance with an embodiment runs bytecode through CMS without any x86 ISA changes or extensions. Using embodiments and techniques described herein, the dynamic language accelerator may be programmed transparently, portably and flexibly. Using the disclosed embodiments, a HW/SW co-designed dynamic language accelerator may accelerate bytecode execution without the need of just-in-time compilation in a VM, and without any x86 changes. Embodiments may be particularly used in connection with mobile and portable devices such as tablet computers, smartphones, and so forth that use non-x86 code, e.g., Java, Javascript, HTML5, ARM, and so forth, to execute such code efficiently with superior performance-per-watt.

The following examples pertain to further embodiments.

Example 1 is a system comprising: a processor to execute instructions, the processor including at least one core and a dynamic language accelerator to execute bytecode responsive to a MMIO operation on a file descriptor associated with the dynamic language accelerator, wherein the processor is to block execution of native code while the dynamic language accelerator executes the bytecode; and a system memory coupled to the processor.

In Example 2, the processor of Example 1 is to optionally configure, via a system call, a mapping of a native state of the processor to a virtual machine state of a virtual machine that is to trigger the dynamic language accelerator, the virtual machine state including a bytecode state.

In Example 3, the processor of Example 2 is to optionally associate an identifier with the virtual machine state.

In Example 4, the dynamic language accelerator of one of Examples 1-3 is to optionally stop execution responsive to a hardware interrupt and the processor is to execute the native code to handle the hardware interrupt, wherein the processor is to re-trigger the dynamic language accelerator after the hardware interrupt is handled.

In Example 5, the dynamic language accelerator of one of Examples 1-4 is to optionally store the bytecode state associated with the identifier prior to the native code execution.

In Example 6, the virtual machine of Example 4 is to optionally interpret at least one bytecode after the hardware interrupt is handled, and thereafter to re-trigger the dynamic language accelerator.

In Example 7, an accelerator native interface is optionally coupled to the dynamic language accelerator, where the dynamic language accelerator is to call back to a native library via the accelerator native interface, and the processor is to execute a function for the virtual machine using the native library and to continue execution of the bytecode in the dynamic language accelerator after the function is executed.

In Example 8, the dynamic language accelerator of one of Examples 1-7, responsive to an exception occurring during the dynamic language accelerator execution, is to optionally stop execution at an instruction of the bytecode prior to a bytecode instruction that caused the exception, where the processor is to thereafter interpret at least one bytecode instruction of the bytecode and execute a native exception handler to handle the exception, and then re-trigger the dynamic language accelerator.

In Example 9 a method comprises: configuring an accelerator mapping and a virtual machine state for a dynamic language accelerator of a processor, and associating the virtual machine state with an identifier for a virtual machine; executing an input/output operation to trigger execution of bytecode in the dynamic language accelerator, and blocking execution of native code; and interpreting at least one bytecode of the bytecode in the virtual machine after the dynamic language accelerator execution of at least a portion of the bytecode.

In Example 10, the method of Example 9 optionally comprises responsive to a hardware interrupt, storing a bytecode state associated with the identifier and thereafter stopping the dynamic language accelerator and executing native code to handle the hardware interrupt.

In Example 11, the method of Example 10 optionally comprises after executing the native code to handle the hardware interrupt, interpreting the at least one bytecode, and thereafter re-triggering the dynamic language accelerator to further execute the bytecode.

In Example 12, the method of one of Examples 9-11 optionally comprises, responsive to an exception, storing a bytecode state associated with the identifier and thereafter stopping the dynamic language accelerator at an instruction prior to the exception, and executing a native exception handler to handle the exception.

In Example 13, the method of one of Examples 9-12 optionally comprises calling, via an accelerator native interface of the dynamic language accelerator, a native library to handle a function for the dynamic language accelerator.

In Example 14 at least one computer readable storage medium comprises instructions that when executed enable a system to: configure an accelerator mapping and a virtual machine state for a dynamic language accelerator of a processor, and associate the virtual machine state with an identifier for a virtual machine; execute an input/output operation to trigger execution of bytecode in the dynamic language accelerator, and block execution of native code; and interpret at least one bytecode of the bytecode in the virtual machine after the dynamic language accelerator execution of at least a portion of the bytecode.

In Example 15, the at least one computer readable medium of Example 14 optionally further comprises instructions that enable the system to determine whether the dynamic language accelerator is able to be opened, and if not, to interpret the bytecode in the virtual machine.

In Example 16, the at least one computer readable medium of one of Examples 14-15 optionally further comprises instructions that enable the system to re-trigger execution of the bytecode in the dynamic language accelerator after the interpretation of the at least one bytecode in the virtual machine.

In Example 17, the at least one computer readable medium of one of Examples 14-16 optionally further comprises instructions that enable the system to, responsive to a hardware interrupt, store a bytecode state associated with the identifier and thereafter stop the dynamic language accelerator and execute native code to handle the hardware interrupt.

In Example 18, the at least one computer readable medium of Example 17 optionally further comprises instructions that enable the system to, after execution of the native code to handle the hardware interrupt, interpret the at least one bytecode, and thereafter re-trigger the dynamic language accelerator to further execute the bytecode.

In Example 19, the at least one computer readable medium of one of Examples 14-18 optionally further comprises instructions that enable the system, responsive to an exception, to store a bytecode state associated with the identifier and thereafter stop the dynamic language accelerator at an instruction prior to the exception, and execute a native exception handler to handle the exception.

In Example 20, the at least one computer readable medium of one of Examples 14-19 optionally further comprises instructions that enable the system to call, via an accelerator native interface of the dynamic language accelerator, a native library to handle a function for the dynamic language accelerator.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A system comprising:
a processor to execute instructions, the processor including at least one core and a dynamic language accelerator to execute bytecode responsive to a memory mapped input/output (MMIO) operation on a file descriptor associated with the dynamic language accelerator, the dynamic language accelerator to receive a pathname from a virtual machine, the pathname to associate the file descriptor with the dynamic language accelerator, wherein the processor is to block execution of native code on the at least one core while the dynamic language accelerator executes is to execute the bytecode and configure, via a system call, a mapping on a native state of the processor to a virtual machine state of a virtual machine that is to trigger the dynamic language accelerator, the virtual machine a state including a bytecode state, and the processor is to associate an identifier with the virtual machine state, the processor further comprising an accelerator native interface coupled to the dynamic language accelerator, where the dynamic language accelerator is to call back to a native library via the accelerator native interface, wherein the processor is to execute a function for the virtual machine using the native library and to continue execution of the bytecode in the dynamic language accelerator after the function is executed; and system memory coupled to a processor.

2. The system of claim 1, wherein the dynamic language accelerator is to stop execution responsive to a hardware interrupt and the processor is to execute the native code on the at least one core to handle the hardware interrupt, wherein the processor is to re-trigger the dynamic language accelerator after the hardware interrupt is handled.

3. The system of claim 2, wherein the dynamic language accelerator is to store the bytecode state associated with the identifier prior to the native code execution.

4. The system of claim 2, wherein the virtual machine is to interpret at least one bytecode after the hardware interrupt is handled, and thereafter to re-trigger the dynamic language accelerator.

5. The system of claim 1, wherein the dynamic language accelerator, responsive to an exception occurring during the dynamic language accelerator execution, is to stop execution at an instruction of the bytecode prior to a bytecode instruction that caused the exception, wherein the processor is to thereafter interpret at least one bytecode instruction of the bytecode and execute a native exception handler to handle the exception, and then re-trigger the dynamic language accelerator.

6. A method comprising:
configuring an accelerator mapping and a virtual machine state for a dynamic language accelerator of a processor, and associating the virtual machine state with an identifier for a virtual machine;
executing an input/output operation to trigger execution of bytecode in the dynamic language accelerator, and blocking execution of native code on a core of the processor while the dynamic language accelerator executes the bytecode; calling, via an accelerator native interface of the dynamic language accelerator, a native library to handle a function for the dynamic language accelerator, wherein the processor is to execute a function for the virtual machine using the native library and to continue execution of the bytecode in the dynamic language accelerator after the function is executed; and
interpreting at least one bytecode of the bytecode in the virtual machine after the dynamic language accelerator execution of at least a portion of the bytecode.

7. The method of claim 6, further comprising responsive to a hardware interrupt, storing a bytecode state associated with the identifier and thereafter stopping the dynamic language accelerator and executing native code to handle the hardware interrupt.

8. The method of claim 7, further comprising after executing the native code to handle the hardware interrupt, interpreting the at least one bytecode, and thereafter re-triggering the dynamic language accelerator to further execute the bytecode.

9. The method of claim 6, further comprising, responsive to an exception, storing a bytecode state associated with the identifier and thereafter stopping the dynamic language accelerator at an instruction prior to the exception, and executing a native exception handler to handle the exception.

10. At least one non-transitory computer readable storage medium comprising instructions that when executed enable a system to:
configure an accelerator mapping and a virtual machine state for a dynamic language accelerator of a processor, and associate the virtual machine state with an identifier for a virtual machine;
execute an input/output operation to trigger execution of bytecode in the dynamic language accelerator, and block execution of native code on a core of the processor while the dynamic language accelerator is to execute the bytecode;
call, via an accelerator native interface of the dynamic language accelerator, a native library to handle a function for the dynamic language accelerator, wherein the processor is to execute a function for the virtual machine using the native library and to continue execution of the bytecode in the dynamic language accelerator after the function is executed; and
interpret at least one bytecode of the bytecode in the virtual machine after the dynamic language accelerator execution of at least a portion of the bytecode.

11. The at least one non-transitory computer readable medium of claim 10, further comprising instructions that enable the system to determine whether the dynamic language accelerator is able to be opened, and if not, to interpret the bytecode in the virtual machine.

12. The at least one non-transitory computer readable medium of claim 10, further comprising instructions that enable the system to re-trigger execution of the bytecode in the dynamic language accelerator after the interpretation of the at least one bytecode in the virtual machine.

13. The at least one non-transitory computer readable medium of claim 10, further comprising instructions that enable the system to, responsive to a hardware interrupt, store a bytecode state associated with the identifier and thereafter stop the dynamic language accelerator and execute native code to handle the hardware interrupt.

14. The at least one non-transitory computer readable medium of claim 13, further comprising instructions that enable the system to, after execution of the native code to handle the hardware interrupt, interpret the at least one bytecode, and thereafter re-trigger the dynamic language accelerator to further execute the bytecode.

15. The at least one non-transitory computer readable medium of claim 10, further comprising instructions that enable the system, responsive to an exception, to store a bytecode state associated with the identifier and thereafter stop the dynamic language accelerator at an instruction prior to the exception, and execute a native exception handler to handle the exception.

* * * * *